United States Patent

Wasley et al.

[15] 3,679,687
[45] July 25, 1972

[54] DERIVATIVES OF 4-[2-(CARBOCYCLOALKOXYMETHYL)PHENYLIMINO]-1,4-DIHYDROQUINOLINES

[72] Inventors: Jan W. F. Wasley, Ossining; Norbert Gruenfeld, Bronx, both of N.Y.

[73] Assignee: Ciba-Geigy Corporation, Greenburgh, N.Y.

[22] Filed: Sept. 11, 1970

[21] Appl. No.: 72,875

Related U.S. Application Data

[63] Continuation-in-part of Ser. No. 827,998, May 26, 1969, abandoned, which is a continuation-in-part of Ser. No. 694,411, Dec. 29, 1967, abandoned.

[52] U.S. Cl.................260/287 R, 260/286 R, 260/287 NO, 260/468 R, 424/250
[51] Int. Cl. ........................................................C07d 33/12
[58] Field of Search ................................................260/287 R

[56] References Cited

UNITED STATES PATENTS

| | | | |
|---|---|---|---|
| 3,449,347 | 6/1969 | Allais et al. | 260/287 |
| 3,458,519 | 7/1969 | Scherren | 260/287 |
| 3,470,186 | 9/1969 | Hanifin | 260/287 |
| 3,502,682 | 3/1970 | Allais et al. | 260/287 |

*Primary Examiner*—Donald G. Daus
*Attorney*—Karl F. Jorda and Bruce M. Collins

[57] ABSTRACT

4-[2-(Carbocycloalkoxymethyl)phenylimino]-1,4-dihydroquinolines bearing a chloro or trifluoromethyl group in the 7-position of the quinoline nucleus are anti-inflammatory and anti-malarial agents and can be prepared through treatment of a cycloalkyl 2-aminophenylacetate with the appropriate 4-chloroquinoline. A typical embodiment is 7-chloro-4-[2-(carbocyclohexyloxymethyl)phenylimino]-1,4-dihydroquinoline.

13 Claims, No Drawings

DERIVATIVES OF 4-[2-(CARBOCYCLOALKOXYMETHYL) PHENYLIMINO]-1,4-DIHYDROQUINOLINES

CROSS REFERENCE

This is a continuation-in-part of Ser. No. 827,998 filed May 26, 1969 which in turn is a continuation-in-part of Ser. No. 694,411 filed Dec. 29, 1967 and now abandoned.

DETAILED DESCRIPTION

The present invention pertains to compounds of the formula:

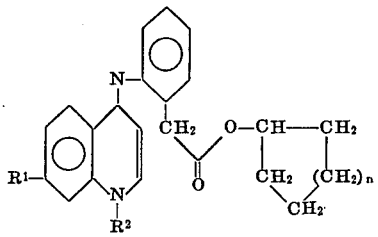

wherein
$R^1$ is chloro or trifluoromethyl,
$R^2$ is hydrogen, hydroxy or methyl, and
n has a value of from 1 to 4.

In addition the present invention pertains to the pharmaceutically acceptable non-toxic acid addition salts of the above compounds, the methods and compositions for pharmaceutical uses of these compounds and their salts, and to processes and chemical intermediates employed in their preparation.

The 4-[2-(carbocycloalkoxymethyl)phenylimino]-1,4-dihydroquinolines of the present invention and their salts possess anti-inflammatory activity. They are accordingly useful to the arts of animal husbandry, medicine, and small animal veterinary practice. Although in each instance the dosage should be carefully titrated to the species being treated, the condition involved and the response desired, using in all instances, sound professional judgment as to the condition and age of the recipient, the compounds are generally administered in a daily dose level of up to about 400 mg/kg of body weight and most often in a daily dosage range of from 1 to about 50 mg/kg. When practical, this daily dosage regimen can be divided into three or four separate dosages.

The 4-[2-(carbocycloalkoxymethyl)phenylimino]-1,4-dihydroquinolines of the present invention are administered parenterally or orally to achieve an anti-inflammatory effect, in any of the usual pharmaceutical forms. These include solid and liquid unit oral dosage forms such as tablets, capsules, powders, suspensions, solutions, syrups and the like, including sustained release preparations, and fluid injectable forms such as sterile solutions and suspensions. The term unit dosage form as used in this specification and the claims refer to physically discrete units to be administered in single or multiple dosage to animals each unit containing a predetermined quantity of active material in association with the required diluent, carrier or vehicle. The quantity of active material is that calculated to produce the desired therapeutic effect upon administration of one or more such units.

Powders are prepared by comminuting the 4-[2-carbocycloalkoxymethyl)phenylimino]-1,4-dihydroquinolines to a suitable fine size and mixing with a similarly comminuted diluent pharmaceutical carrier such as an edible carbohydrate material as for example, starch. Sweetening, flavoring, preservative, dispersing and coloring agents can also be present.

Capsules are made by preparing a powder mixture as described above and filling formed gelatin sheaths. A lubricant such as talc, magnesium stearate and calcium stearate can be added to the powder mixture as an adjuvant before the filling operation; a glidant such as colloidal silica may be added to improve flow properties; a disintegrating or solubilizing agent may be added to improve the availability of the medicament when the capsule is ingested.

Tablets are made by preparing a powder mixture, granulating or slugging, adding a lubricant and disintegrant and pressing into tablets. A powder mixture is prepared by mixing the compound, suitably comminuted, with a diluent or base such as starch, sucrose, kaolin, dicalcium phosphate and the like. The powder mixture can be granulated by wetting with a binder such as syrup, starch paste, acacia mucilage or solutions of cellulosic or polymeric materials and forcing through a screen. As an alternative to granulating, the powder mixture can be run through the tablet machine and the resulting imperfectly formed slugs broken into granules. The granules can be lubricated to prevent sticking to the tablet forming dies by means of the addition of stearic acid, a stearate salt, talc or mineral oil. The lubricated mixture is then compressed into tablets. The medicaments can also be combined with free flowing inert carriers and compressed into tablets directly without going through the granulating or slugging steps. A protective coating consisting of a sealing coat of shellac, a coating of sugar or polymeric material and a polish coating of wax can be provided. Dyestuffs can be added to these coatings to distinguish different unit dosages.

Oral fluids such as syrups and elixirs can be prepared in unit dosage form so that a given quantity, e.g., a teaspoonful, contains a predetermined amount of the compound. Syrups can be prepared by dissolving the compound in a suitably flavored aqueous sucrose solution while elixirs are prepared through the use of a non-toxic alcoholic vehicle. Suspensions can be formulated by dispersing the compound in a non-toxic vehicle in which it is insoluble.

Fluid unit dosage forms for parenteral administration can be prepared by suspending or dissolving a measured amount of the compound in a non-toxic liquid vehicle suitable for injection such as an aqueous or oleaginous medium and sterilizing the suspension or solution. Alternatively a measured amount of the compound is placed in a vial and the vial and its contents are sterilized and sealed. An accompanying vial or vehicle can be provided for mixing prior to administration.

One important embodiment of the present invention, particularly for preparing solid pharmaceutical formulations is the pharmaceutically acceptable non-toxic acid addition salts of these 4-[2-(carbocycloalkoxymethyl)phenylimino]-1,4-dihydroquinolines. Such pharmaceutically acceptable non-toxic salts include those derived from both organic and inorganic acids such as, without limitation, hydrochloric, hydrobromic, sulfuric, phosphoric, methanesulfonic, acetic, lactic, succinic, malic, maleic, aconitic, phthalic, tartaric, embonic, enanthic and the like acids.

The anti-inflammatory activity of these compounds can be conveniently observed in standard pharmacological tests which have been correlated by the art to this therapeutic response. Such tests, for example, include the UV erythema test, the established adjuvant arthritis model, the anti-carrageenin test and the turbidity model. Thus, for example, 7-chloro-4-[2-(carbocyclohexyloxymethyl)phenylimino]-1,4-dihydroquinoline as the hydrochloride salt demonstrates 65% protection at 2 hours and 33% at three hours when administered orally in a dose of 100 mg/kg in the anti-carrageenin test. At a dose of 50 mg/kg via the same route, this compound demonstrates 41 percent protection at 3 hours in the same test. In the turbidity model, utilizing the intact animal, oral doses of 100, 50, 25 and 12.5 mg/kg demonstrate a 40 percent, 35 percent, 51 percent and 17 percent response respectively. The toxicity of these compounds also appears to be low. Thus, for example, the same compound demonstrates an oral $LD_{50}$ in the rat of greater than 2,000 mg/kg. At and above the therapeutic doses, e.g., as high as 200 mg/kg, no gastric irritation is observed. In addition to the anti-inflammatory activity of these compounds, they also demonstrate inhibition of imidazole-N-methyl transferase at concentrations as low as $10^{-5}$ M, thus indicating their usefulness as antimalarial agents.

It will be appreciated that when $R_2$ is hydrogen or hydroxy, the compounds of the present invention can exist in or be depicted as being in the tautomeric 4-phenylaminoquinoline form, which is within the scope of the present invention.

The compounds of the present invention are prepared by treating a 4-haloquinoline bearing a chloro or trifluoromethyl group in the 7-position with a cycloalkyl 2-aminophenylacetate in the presence of an acid catalyst. The cycloalkyl 2-aminophenylacetate is thus allowed to react with at least a molar equivalent of the 4-haloquinoline at temperatures of from about 50° to about 150° C in an organic reaction medium such as benzene, dimethylformamide, dimethylsulfoxide, chloroform, acetone, acetonitrile and the like, or mixtures thereof, preferably acetonitrile or dimethylsulfoxide. This is conveniently accomplished by heating the mixture for a period of from about 1 hour to about 100 hours, generally about 3 hours. The product is obtained in the form of the hydrohalide salt and can be isolated via conventional methods. The reaction product can also be isolated as a free base and converted to the acid addition salt or isolated as the acid addition salt and converted to the free base via conventional methods.

The above reaction is preferably executed on those compounds wherein $R_2$ is hydrogen. The corresponding compounds where $R_2$ is hydroxy are generally prepared by treating the corresponding compound where $R_2$ is hydrogen with a suitable oxidizing agent, preferably m-chloroperbenzoic acid, in an inert organic solvent, generally chloroform, at temperatures of from about 20° to about 100° for about 1 hour. The product is isolated by conventional methods and can be converted into its acid addition salts.

Those compounds of Formula I wherein $R_2$ is methyl, are prepared through treatment of the corresponding compound where $R_5$ is hydrogen with a methyl halide or sulfate in an inert organic solvent such as benzene, toluene, chloroform, acetonitrile or the like at temperatures of from about 50° to about 150° for about 2 hours. The desired product precipitates as the acid addition salt and a free base may be obtained through conventional methods, e.g., addition of ammonia to the evaporated reaction mixture.

The following examples set forth the manner and process of making typical embodiments of the invention, without being a limitation thereof, and include the best mode contemplated for carrying out the invention.

EXAMPLE 1

7-Chloro-4-[2-(carbocyclohexyloxymethyl)phenylimino]-1,4-dihydroquinoline a. A mixture of 200 g of 2C/acid, 500 ml of cyclohexanol, and 20 ml of sulfuric acid are combined and heated under reflux for 18 hours. The mixture is diluted with ether 500 ml, washed with 1 percent ammonium hydroxide and then washed thoroughly with water (3 × 1,000 ml). The ethereal solution is dried over magnesium sulfate and the ether is removed under reduced pressure to yield an amber oil. The oil is distilled under vacuum to yield the product as a pale yellow oil; b.p. 165°–168°0.15 mm.

b. A mixture of 50.0 g of cyclohexyl 2-nitrophenylacetate, 5 g of 5 percent palladium-on-barium sulfate and 500 ml of ethyl acetate are combined and hydrogenated at atmospheric pressure until 3 mole equivalents of hydrogen are absorbed. The catalyst is collected by filtration and the ethyl acetate is evaporated off under reduced pressure. The residue is used immediately in the next step.

c. A mixture of 40 g of 4,7-dichloroquinoline, 1.0 ml of concentrated hydrochloric acid, and 500 ml of acetonitrile are combined and heated to 65° C, and 44.3 g of cyclohexyl 2-aminophenylacetate is added and the temperature is lowered to 45° C. The mixture is maintained at this temperature for 18 hours. During this time the color of the solution changes to a deep red and the hydrochloride of the salt separates as an oil. The mother liquids are decanted and the oil is dissolved in hot methanol (200 ml) and ether (1,000 ml) is added. Upon scratching the salt crystallizes and is collected by filtration.

The salt is dissolved in hot methanol (200 ml) and the solution is rendered basic with 10 percent ammonium hydroxide. Water is added and the product separates as an oil. The mother liquids are decanted and the oil is dissolved in chloroform and the chloroform solution is washed with water and dried over magnesium sulfate. The solution is concentrated to about 50 ml under reduced pressure and the residue is chromatographed on a neutral alumina column using chloroform as the eluant. The chloroform is removed under reduced pressure and the residue is recrystallized twice from methanol, m.p. 101°–102° C.

EXAMPLE 2

7-Trifluoromethyl-4-[2-(carbocyclohexyloxymethyl)phenylimino]-1,4-dihydroquinoline 4-Chloro-7-trifluoromethylquinoline (44.1 g, 0.19 moles), concentrated hydrochloric acid (1.6 ml, 0.019 moles) and acetonitrile (300 ml) are combined and heated to 40° C. To this is added slowly a solution of cyclohexyl 2-aminophenylacetate (44.3 g, 0.19 moles) in acetonitrile (50 ml). The mixture is heated at 40° C for 4 hours. During this time the color of the solution changes to a deep red and a solid begins to form. The mixture is stirred at room temperature overnight and the product is collected by filtration, washed with acetonitrile and ether, and dried in air. The product as the hydrochloride salt is recrystallized from methanol-ether, m.p. 149°–151° C.

$C_{24}H_{24}ClF_3N_2O_2$ requires:
C: 62.00, H: 5.20, N: 6.03, Cl: 7.63, F: 12.26
Found 61.83 5.29, 6.00, 7.63, 12.00

EXAMPLE 3

7-Chloro-4-[2-(carbocyclopentyloxymethyl)phenylimino]-1,4-dihydroquinoline a. Cyclopentyl 2-nitrophenylacetate. 2-Nitrophenylacetic acid (70.0 g, 0.387 moles), cyclopentanol (300 g) and sulfuric acid (10 ml) are combined and heated under reflux for 6 hours. During this time, azeotropic water is collected (32 ml) by use of a Dean-Stark apparatus. The mixture is poured into ice-water, neutralized with 10 percent ammonium hydroxide and extracted into ether (3 × 200 ml). The ethereal solutions are combined, washed with water (5 × 200 ml), charcoaled dried over sodium sulfate, filtered and the solvent is evaporated to dryness under reduced pressure. The excess cyclopentanol is removed by distillation and the residue is dissolved in ether, charcoaled, filtered and the solvent evaporated to dryness to yield a yellow oil, which crystallizes on standing.

b. Cyclopentyl 2-aminophenylacetate. Cyclopentyl 2-nitrophenylacetate (56.8 g, 0.228 mole), 5 percent palladium-on-barium sulfate (6.0 g) and ethyl acetate (400 ml) are combined and hydrogenated at atmospheric pressure until 3 mole equivalents of hydrogen are absorbed. The catalyst is removed by filtration and the solvent evaporated under reduced pressure. The residue is used in the next step without further purification.

c. 7-Chloro-4-[2-(carbocyclopentyloxymethyl)phenylimino]-1,4-dihydroquinoline. 4,7-Dichloroquinoline (21.6 g, 0.114 mole), concentrated hydrochloric acid (0.95 ml, 0.0114 mole) and acetonitrile (200 ml) are combined and heated to 50° C. To this solution is slowly added cyclopentyl 2-aminophenylacetate (25.0 g, 0.114 mole) and the mixture is heated at 50° C for 18 hours. During this time the color of the solution changes to a deep red and the product crystallizes. The product as the hydrochloride salt is collected by filtration, washed with acetonitrile and ether, and is recrystallized from methanol-acetone, m.p. 232°–234° C.

$C_{22}H_{22}Cl_2N_2O_2$ requires:
C: 63.31, H: 5.32, N: 6.72, Cl: 17.00
Found 63.57, 5.47 6.77 17.18

EXAMPLE 4

7-Trifluoromethyl-4-[2-(carbocyclopentyloxymethyl)phenyl imino]-1,4-dihydroquinoline 4-Chloro-7-trifluoromethylquinoline (26.4 g, 0.114 mole), concentrated hydrochloric acid (0.95 ml, 0.0114 mole) and acetonitrile (200 ml) are combined and heated to 50° C. To this solution cyclopentyl 2-aminophenylacetate (25.0 g, 0.114 mole) is added slowly and the mixture is heated at 50° C for 18 hours. During this time the color of the solution changes to a deep red and upon cooling and scratching the product crystallizes. The product as the hydrochloride is collected by filtration, washed with acetonitrile and ether, and is recrystallized from methanol-ether, m.p. 191°–193° C.

$C_{23}H_{22}ClF_3N_2O_2$ requires:

C: 61.26, H: 4.92, N: 6.21, Cl: 7.86, F: 12.64

Found 61.41 4.66 6.06 7.96 12.61

EXAMPLE 5

7-Trifluoromethyl-4-[2-(carbocycloheptyloxymethyl)phenyl imino]-1,4-dihydroquinoline a. Cycloheptyl 2-nitrophenylacetate. 2-Nitrophenylacetic acid (100 g, 0.552 mole), cycloheptanol (200 g) and sulfuric acid (5 ml) are combined and heated under reflux for 4 hours. During this time 35 ml of azeotropic water are collected in a Dean-Stark apparatus. The solution is poured into ice-water, neutralized with 10 percent ammonium hydroxide, extracted into ether (3 × 300 ml). The ethereal solutions are combined, washed with water, dried over sodium sulfate, charcoaled, filtered and the solvent evaporated to dryness under reduced pressure. The excess cycloheptanol is removed by distillation and the residue is dissolved in ether, charcoaled filtered and evaporated to dryness under reduced pressure to yield a pale yellow oil.

b. Cycloheptyl 2-aminophenylacetate. Cycloheptyl 2-nitrophenylacetate (76.4 g, 0.279 mole), 5 percent palladium-on-barium sulfate (8.0 g) and ethyl acetate (500 ml) are combined and hydrogenated at atmospheric pressure until 3 mole equivalents of hydrogen are absorbed. The catalyst is removed by filtration and the solvent evaporated to dryness under reduced pressure. The product is used in the next step without further purification.

c. 7-Trifluoromethyl-4-[2-(carbocycloheptyloxymethyl)-phenylimino-1,4-dihydroquinoline. 4-Chloro-7-trifluoromethylquinoline (30.2 g, 0.139 mole), concentrated hydrochloric acid (1.1 ml, 0.0139 mole), and acetonitrile (200 ml) are combined and heated to 50° C. To this solution cycloheptyl 2-aminophenylacetate (32.1 g, 0.139 mole) is added slowly and the mixture is heated at 50° C for 18 hours. During this time the color of the solution changes to a deep red and upon cooling, scratching and the addition of ether, (≈ 100 ml) the product crystallizes. The product as the hydrochloride salt is collected by filtration, washed with acetonitrile and ether and is recrystallized from methanol-ether, m.p. 147°–149° C.

$C_{25}H_{26}ClF_3N_2O_2$ requires:

C: 62.69, H: 5.47, N: 5.85, Cl: 7.40, F: 11.90

Found 62.94 5.48 5.86 7.25 11.97

EXAMPLE 6

7-Chloro-4-[2-(carbocyclooctyloxymethyl)phenylimino]-1,4-dihydroquinoline a. Cyclooctyl 2-nitrophenylacetate. 2-Nitrophenylacetic acid (100 g, 0.552 mole), cyclooctanol (200 g) and sulfuric acid (5 ml) are combined and heated under reflux for 4 hours. During this time 42 ml of azeotropic water is collected by use of a Dean-Stark apparatus. The solution is poured into ice-water, neutralized with 10 percent ammonium hydroxide, extracted into ether (3 × 500 ml). The ethereal solutions are combined, washed with water, (3 × 500 ml) dried over sodium sulfate, charcoaled, filtered and the solvent is evaporated under reduced pressure. The excess cyclooctanol is removed by distillation and the residue is dissolved in ether, charcoaled, filtered and evaporated to dryness under reduced pressure to yield a pale yellow oil.

b. Cyclooctyl 2-aminophenylacetate. Cyclooctyl 2-nitrophenylacetate (74.9 g, 0.259 mole), 5 percent palladium-on-barium sulfate (8.0 g) and ethyl acetate (500 ml) are combined and hydrogenated at-atmospheric pressure until 3-mole equivalents of hydrogen are absorbed. The catalyst is removed by filtration and the solvent evaporated to dryness under reduced pressure. The product is used in the next step without further purification.

c. 7-Chloro-4-[2-(carbocyclooctyloxymethyl)phenylimino]-1,4-dihydroquinoline. 4,7-Dichloroquinoline (24.8 g, 0.125 mole), concentrated hydrochloric acid (1.0 ml, 0.0125 mole) and acetonitrile (200 ml) are combined and heated at 50° C. To this solution is slowly added cyclooctyl 2-aminophenylacetate (31.7 g, 0.125 mole) and the mixture is heated at 50° C for 18 hours. During this time the color of the solution changes to a deep red. The solution is cooled in an ice-water bath and after scratching and stirring for 24 hours, the product crystallizes. The product as the hydrochloride salt is recrystallized from methanol-ether.

$C_{25}H_{28}Cl_2N_2O_2$ requires:

C: 65.36, H: 6.14, N: 6.10, Cl: 15.44

Found 65.08 6.35 6.03 15.30

EXAMPLE 7

7-Trifluoromethyl-4-[2-(carbocyclooctyloxymethyl)phenylimino]-1,4-dihydroquinoline 4-Chloro-7-trifluoromethylquinoline (32.9 g, 0.125 mole), concentrated hydrochloric acid (1.0 ml, 0.125 mole) and acetonitrile (200 ml) are combined and heated to 50° C. To this solution cyclooctyl 2-aminophenylacetate (31.7 g, 0.125 mole) is added and the mixture is heated at 50° C for 18 hours. During this time the color of the solution changes to a deep red and upon cooling in an ice-water bath, scratching and stirring for 6 hours the product crystallizes. The product as the hydrochloride salt is collected by filtration, washed with acetonitrile and ether, and is recrystallized from methanol-ether, m.p. 201°–203° C.

$C_{26}H_{28}ClF_3N_2O_2$ requires:

C: 63.35, H: 5.73, N: 5.68, Cl: 7.19, F: 11.56

Found C: 63.59 5.72 5.69 7.12 11.43

EXAMPLE 8

7-Trifluoromethyl-4-[2-(carbocyclohexyloxymethyl)phenylimino]-1,4-dihydroquinoline-1-oxide 7-Trifluoromethyl-4-[2-(carbocyclohexyloxymethyl)-phenylamino]quinoline (37.4 g, 0.0874 mole) in chloroform (250 ml) is added to a solution of m-chloroperbenzoic acid (19.6 g, 0.0961 mole) in chloroform (250 ml). The color of the mixture immediately begins to change from yellow to deep green. The solution is heated under reflux for 1/2 hour on a steam bath. During this time the color changes from the green to deep reddish yellow. The chloroform is evaporated to dryness and the residue dissolved in ether and upon the addition of petroleum ether the product, as the free base, precipitates and is collected by filtration; m.p. 187°–190° C.

The free base is dissolved in isopropyl alcohol (150 ml) and treated with 8N ethanolic HCl (10 ml). Upon the addition of petroleum ether, the hydrochloride salt of the product crystallizes, m.p. 137°–139° C.

EXAMPLE 9

7-Trifluoromethyl-1-methyl-4-[2-(carbocyclohexyloxymethyl)-phenylimino]-1,4-dihydroquinoline Hydroiodide 7-Trifluoromethyl-4-[2-(carbocyclohexyloxymethyl)-phenylimino]-1,4-dihydroquinoline (16.0 g, 0.0327 mole), methyl iodide (13.9 g, 0.981 mole) and chloroform (100 ml) are combined and heated under reflux for 4 hours. During this time the color of the solution changes from yellow to a deep orange. The solvent is evaporated under reduced pressure and the product recrystallized twice from methanol-ether, m.p. 220°–222° C.

EXAMPLE 10

7-Chloro-1-methyl-4-[2-carbocyclohexyloxymethyl)phenylimino]-1,4-dihydroquinoline Hydroiodide

7-Chloro-4-[2-(carbocyclohexyloxymethyl)phenylimino]-1,4-dihydroquinoline (20.0 g, 0.051 mole), methyl iodide (21.3 g, 0.153 mole) and acetonitrile (100 ml) are combined and heated under reflux for 4 hours. During this time the color of the solution changes to a deep orange. Upon cooling the product crystallizes and is collected by filtration, washed with acetonitrile (100 ml) and ether (200 ml). The product is recrystallized from methanol-acetone, m.p. 221°–223° C.

$C_{24}H_{26}ClIN_2O$ requires:
C: 53.69, H: 4.88, N: 5.22, Cl: 6.61, I: 23.64
Found 53.44, 4.88, 5.43, 6.39, 23.47

EXAMPLE 11

7-Chloro-4-[2-(carbocycloheptyloxymethyl)phenylimino]-1,4-dihydroquinoline

4,7-Dichloroquinoline (25.7 g, 0.139 mole), concentrated hydrochloric acid (1.1 ml, 0.0139) and acetonitrile (200 ml) are combined and heated at 50° C. To this solution is added slowly cycloheptyl 2-aminophenylacetate (32.1 g, 0.139 mole). The mixture is heated at 50° C for 18 hrs. During this time the color of the solution changes to a deep red and upon cooling, scratching and the addition of ether (200 ml) the product crystallizes. The product as the hydrochloride is recrystallized from methanol-ether with cooling, m.p. 130°–131° C.

$C_{24}H_{26}Cl_2N_2O_2$ requires:
C: 64.71 H: 5.88, N: 6.29, Cl: 15.92
Found C: 64.30, 5.74, 6.33, 15.91

EXAMPLE 12

7-Chloro-4-[2-(carbocyclohexyloxymethyl)phenylimino]-1,4-dihydroquinoline-1-oxide Hydrochloride

7-Chloro-4-[2-(carbocyclohexyloxymethyl)phenylimino]-1,4-dihydroquinoline (53.2 g, 0.132 mole) in chloroform (250 ml) is added to a solution of m-chloroperbenzoic acid (29.5 g, 0.145 mole) in chloroform (200 ml). The color of the mixture immediately begins to change from yellow to a deep green. The solution is heated under reflux for one-half hour on a steam bath. During this time the color changes from green to deep reddish-yellow. The chloroform solution is extracted with 5 percent sodium bicarbonate solution (3 × 250 ml), washed with water (3 × 250 ml), dried over sodium sulfate, filtered and evaporated to dryness under reduced pressure. The gummy residue is dissolved in ether and upon standing the free base of the product crystallizes. The product is collected by filtration, washed with ether, dissolved in chloroform, charcoaled, filtered and concentrated in volume to about 75 ml. This is chromatographed on a neutral alumina column using chloroform as the eluant. The chloroform is evaporated under reduced pressure and the residue is titurated with ether. The free base is dissolved in 8N ethanolic hydrochloric acid is added followed by the addition of ether. The product crystallizes from the ethanol-ether solution and is collected by filtration, washed with ether and dried, m.p. 164°–166° C.

$C_{23}H_{24}Cl_2N_2O_3$ requires:
C: 61.75, H: 5.41, N: 6.26, Cl: 15.85
Found 61.43, 5.32, 6.33, 16.01

EXAMPLE 13

| Ingredient | quantity/capsule |
|---|---|
| 7-Chloro-4-[2-(carbocyclohexyloxymethyl)-phenylimino]-1,4-dihydroquinoline | 10 mg |
| Corn Starch, U.S.P. | 200 mg |

The foregoing ingredients are mixed and introduced into a two-piece No. 1 hard gelatin capsule.

EXAMPLE 14

| Ingredient | Quantity/tablet |
|---|---|
| 7-Trifluoromethyl-4-[2-(carbocyclohexyloxymethyl)phenylimino]-1,4-dihydroquinoline | 50 mg |
| Corn Starch U.S.P. | 130 mg |
| Lactose | 160 mg |
| Cab-O-Sil M-5 | 4 mg |
| Gelatin U.S.P. | 5 mg |
| Magnesium Stearate U.S.P. | 1 mg |

The foregoing ingredients are thoroughly mixed and pressed into tablets suitable for oral administration of 50 mg of active ingredient. The tablets may be scored to permit administration of fractional doses.

What is claimed is:

1. A compound of the formula:

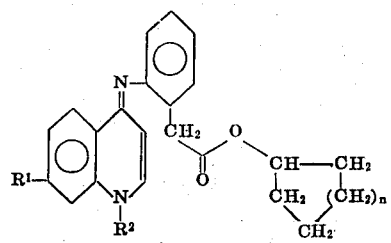

wherein $R^1$ is chloro or trifluoromethyl,
$R^2$ is hydrogen, hydroxy or methyl, and
$n$ has a value of from 1 to 4 and pharmaceutically acceptable acid addition salts thereof.

2. The compound according to claim 1 wherein $n$ is 1, $R^1$ is chloro and $R^2$ is hydrogen.

3. The compound according to claim 1 wherein $n$ is 1, $R^1$ is trifluoromethyl and $R^2$ is hydrogen.

4. The compound according to claim 1 wherein $n$ is 2, $R^1$ is chloro and $R^2$ is hydrogen.

5. The compound according to claim 1 where $n$ is 2, $R^1$ is trifluoromethyl and $R^2$ is hydrogen.

6. The compound according to claim 1 wherein $n$ is 3, $R^1$ is chloro and $R^2$ is hydrogen.

7. The compound according to claim 1 wherein $n$ is 3, $R^1$ is trifluoromethyl and $R^2$ is hydrogen.

8. The compound according to claim 1 wherein $n$ is 4, $R^1$ is chloro and $R^2$ is hydrogen.

9. The compound according to claim 1 wherein $n$ is 4, $R^1$ is trifluoromethyl and $R^2$ is hydrogen.

10. The compound according to claim 1 wherein $n$ is 2, $R^1$ is chloro and $R^2$ is methyl.

11. The compound according to claim 1 wherein $n$ is 2, $R^1$ is trifluoromethyl and $R^2$ is methyl.

12. The compound according to claim 1 wherein $n$ is 2, $R^1$ is chloro and $R^2$ is hydroxy.

13. The compound according to claim 1 wherein $n$ is 2, $R^1$ is trifluoromethyl and $R^2$ is hydroxy.

* * * * *